(12) United States Patent
Tracy et al.

(10) Patent No.: US 7,935,287 B2
(45) Date of Patent: May 3, 2011

(54) KEYBOARD CASE MANUFACTURING SYSTEM AND METHOD

(75) Inventors: Mark S Tracy, Tomball, TX (US); Earl W Moore, Cypress, TX (US); Paul N Walker, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/399,677

(22) Filed: Mar. 6, 2009

(65) Prior Publication Data

US 2010/0225020 A1    Sep. 9, 2010

(51) Int. Cl.
  *B29C 37/00*    (2006.01)
  *B29C 45/00*    (2006.01)
  *B29C 35/00*    (2006.01)
  *B29B 7/00*     (2006.01)
  *B29B 11/06*    (2006.01)
  *B28B 5/00*     (2006.01)
  *A23P 1/00*     (2006.01)

(52) U.S. Cl. ........ 264/161; 264/328.9; 264/328.12; 264/250; 264/251; 425/573; 425/567

(58) Field of Classification Search .......... 264/161, 264/250, 251, 328.9, 328.12; 425/573, 567
See application file for complete search history.

(56) References Cited

U.S. PATENT DOCUMENTS

| | | | | |
|---|---|---|---|---|
| 4,057,710 A * | 11/1977 | Willmott | ............. | 235/145 R |
| 4,464,325 A * | 8/1984 | Kondo et al. | ............. | 264/229 |
| 4,775,574 A * | 10/1988 | Fukushima et al. | ........ | 428/209 |
| 6,303,983 B1 * | 10/2001 | Koike | ............. | 257/670 |
| 6,623,660 B1 * | 9/2003 | Kimura | ............. | 252/299.01 |
| 7,211,215 B1 * | 5/2007 | Tomassen et al | ............. | 264/511 |
| 2004/0119698 A1 * | 6/2004 | Chao et al. | ............. | 345/168 |
| 2007/0007687 A1 | 1/2007 | Chao et al. | | |

* cited by examiner

*Primary Examiner* — Khanh Nguyen
*Assistant Examiner* — Matthew Hoover
(74) *Attorney, Agent, or Firm* — Michael S. Czarnecki

(57) ABSTRACT

Methods for forming a keyboard case are provided. A mold cavity configured to provide a keyboard case having a plurality of apertures disposed therethrough can be at least partially filled with a molten material. At least one runner can traverse at least a portion of the apertures forming the plurality of apertures. The molten material can be at least partially solidified within the mold cavity to provide the keyboard case. The keyboard case can be removed from the mold cavity and the at least one runner can be removed from at least a portion of the apertures forming the plurality of apertures.

20 Claims, 4 Drawing Sheets

KEYBOARD CASE MANUFACTURING SYSTEM AND METHOD

BACKGROUND OF THE INVENTION

Description of the Related Art

This section is intended to introduce the reader to various aspects of art which may be related to one or more aspects of the present invention as described and claimed below. This discussion is believed helpful in providing the reader with background information, thereby facilitating a better understanding of various aspects of the present invention. Accordingly, it should be understood by the reader that the provided information should be read in this light and not as an admission of any prior art.

"Chicklet" keyboards are an industry phrase for notebook PC keyboards having a non-traditional wall or rib space between the keycaps forming the keyboard. The term "chicklet" refers to the shape of the keys, inasmuch as they bear a striking resemblance to pieces of "Chicklets®" brand gum. The Chicklet keyboard is gaining acceptance and is often viewed as a modern styling enhancement for portable personal computers such as laptops and the emergent ultra-portable or "netbook" computers. Frequently, the keycap openings for Chicklet style keyboards are molded directly into the keyboard case. Many keyboard cases are injection molded, and due to the limitations of injection molding technology, the thin "ribs" between the key caps can have a weld line where the two molten plastic flows meet during the injection molding process. Such weld lines are unsightly and structurally weak, thereby compromising both the aesthetics and the strength of the keyboard deck.

SUMMARY OF THE INVENTION

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Methods for forming a keyboard case are provided. A mold cavity configured to provide a keyboard case having a plurality of apertures disposed therethrough can be at least partially filled with a molten material. At least one runner can traverse at least a portion of the apertures forming the plurality of apertures. The molten material can be at least partially solidified within the mold to provide the keyboard case. The keyboard case can be removed from the mold and the at least one runner can be removed from at least a portion of the plurality of apertures.

Another method of forming a keyboard case is also provided. A keyboard upper case having a plurality of apertures disposed therethrough can be injection molded. At least one runner can be disposed in at least a portion of the apertures forming the plurality of apertures. The at least one runner can be removed from the apertures forming the plurality of apertures.

A system for forming a keyboard case is also provided. The system can include a means for filling a mold cavity with a molten material. The mold cavity can be suitable for providing a keyboard case having a plurality of apertures. At least one runner can traverse at least a portion of the plurality of apertures. The system can further include a means for at least partially solidifying the molten material within the mold cavity to form the keyboard case. The system can additionally include a means for removing the keyboard case from the mold cavity. The system can also include a means for removing the at least one runner from at least a portion of the apertures forming the plurality of apertures.

As used herein, the term "runner" or the plural "runners" refers to one or more fluid conduits, channels, or passageways adapted to flow a molten thermosetting or thermoplastic material, at a temperature greater than its melting temperature, into, through, or about a mold cavity. Runners generally do not form part of the finished product, and are generally removed from the product during manufacture or by the end user.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Advantages of one or more disclosed embodiments may become apparent upon reading the following detailed description and upon reference to the drawings in which.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
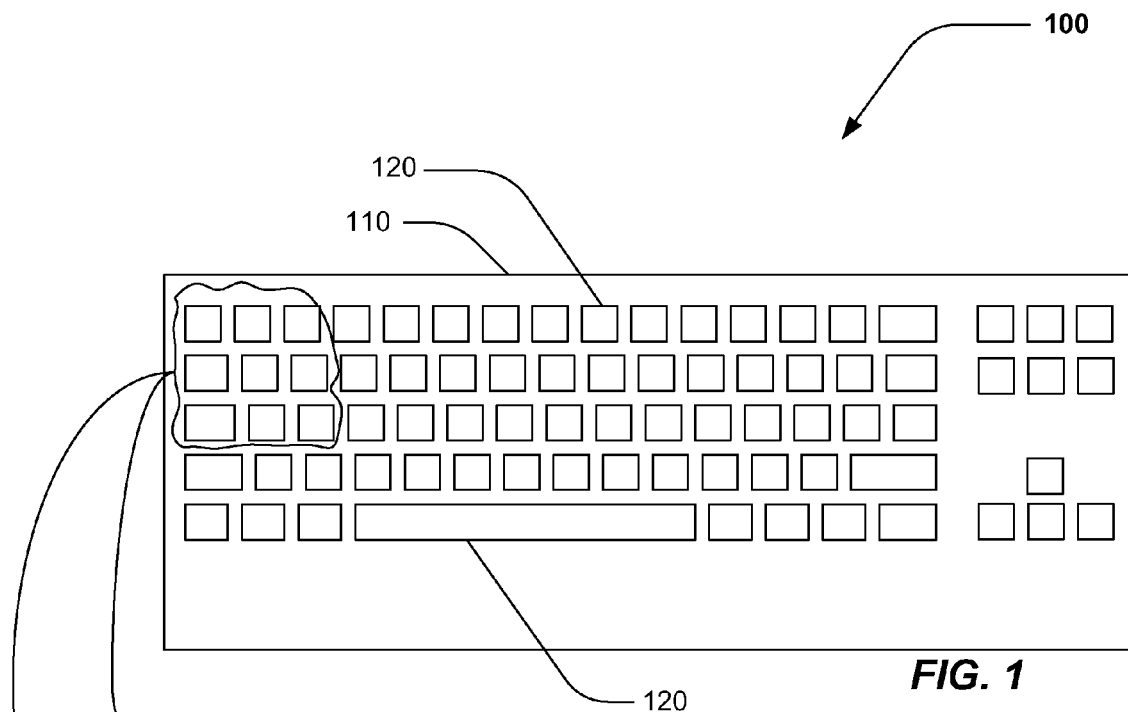
FIG. 1 is a plan view depicting an illustrative keyboard deck apparatus.

FIG. 1 is a plan view depicting an illustrative keyboard case 100. The keyboard case 100 depicted in FIG. 1 can include a keyboard deck 110 having a plurality of apertures 120 disposed therethrough. The keyboard deck 110 can have any physical size or configuration currently known or to be discovered in the art. For example, the keyboard deck 110 can be adapted for use in peripheral keyboards commonly used with desktop computer systems, for use in portable computers such as laptops, "netbooks," and ultra-portables, or even handheld devices using a keyboard-based input device.

A plurality of apertures 120 can be disposed about the keyboard deck 110. In one or more embodiments, the plurality of apertures 120 can correspond to the physical location of one or more keycaps forming the keyboard. In one or more embodiments, each of the plurality of apertures 120 can permit the corresponding key cap, when depressed by a user, to engage a switching device disposed beneath the key cap, thereby providing input to an attached device such as a computing device.

Figure 1A:
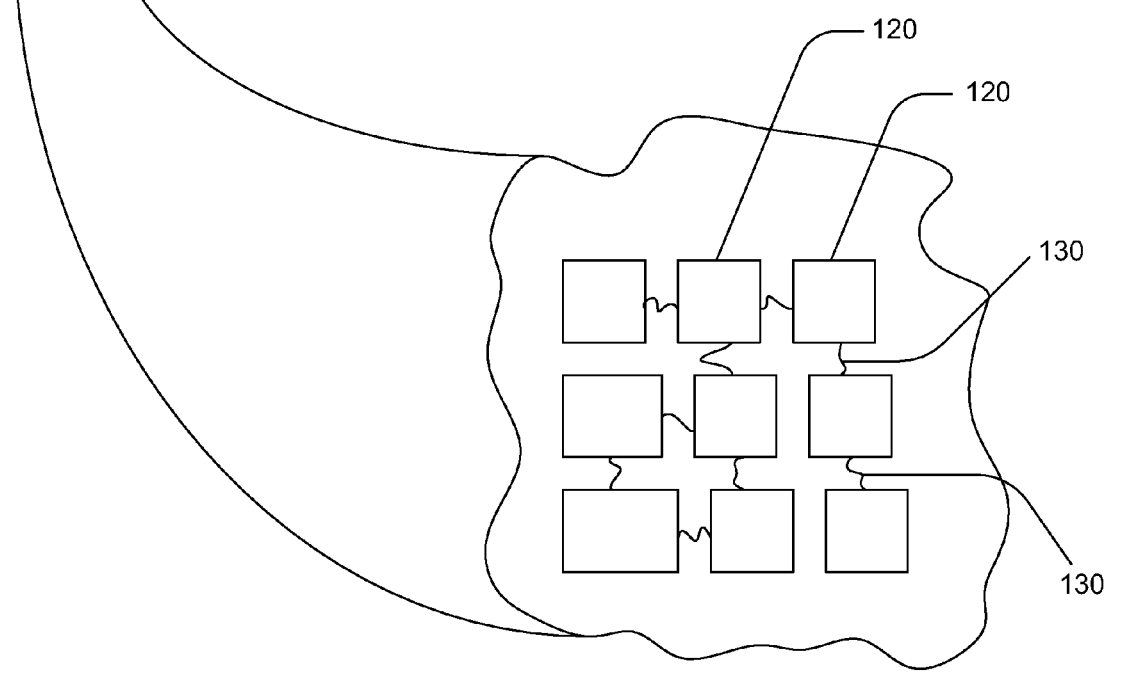
FIG. 1A is a partial detail view of the indicated portion of the illustrative keyboard deck apparatus depicted in FIG. 1.

FIG. 1A is a partial detail view of the indicated portion of the illustrative keyboard case 100 depicted in FIG. 1. FIG. 1A depicts the weld lines 130 that can form between the plurality of apertures 120 during the manufacture of the keyboard case 100. Keyboard cases 100 can be manufactured using injection mold technology wherein a thermosetting or thermoplastic material is heated to a temperature in excess of its melting point and injected under pressure into a mold having a mold cavity configured to provide a finished or semi-finished keyboard case 100. In one or more specific embodiments, the molten plastic can be simultaneously or sequentially introduced to the mold cavity at a number of points to minimize the fill time of the mold and to ensure that molten material is distributed near uniformly throughout the mold.

In one or more embodiments, the molten material, once introduced to the mold cavity, can begin to cool and solidify. In one or more embodiments, due to the large number of apertures 120 and relatively small spaces between the apertures 120, the molten material can begin to "skin" or solidify in a thin layer on the surface of the molten material prior to the complete filling of the mold. In one or more embodiments, the two streams of semi-solid molten material can meet in the interstitial spaces between the apertures 120. In one or more embodiments, the intersection or joint line forming between the two streams of molten material can be manifested as a weld line 130. The weld line 130 can be both visually distracting and structurally weaker than the surrounding plastic.

Figure 2:
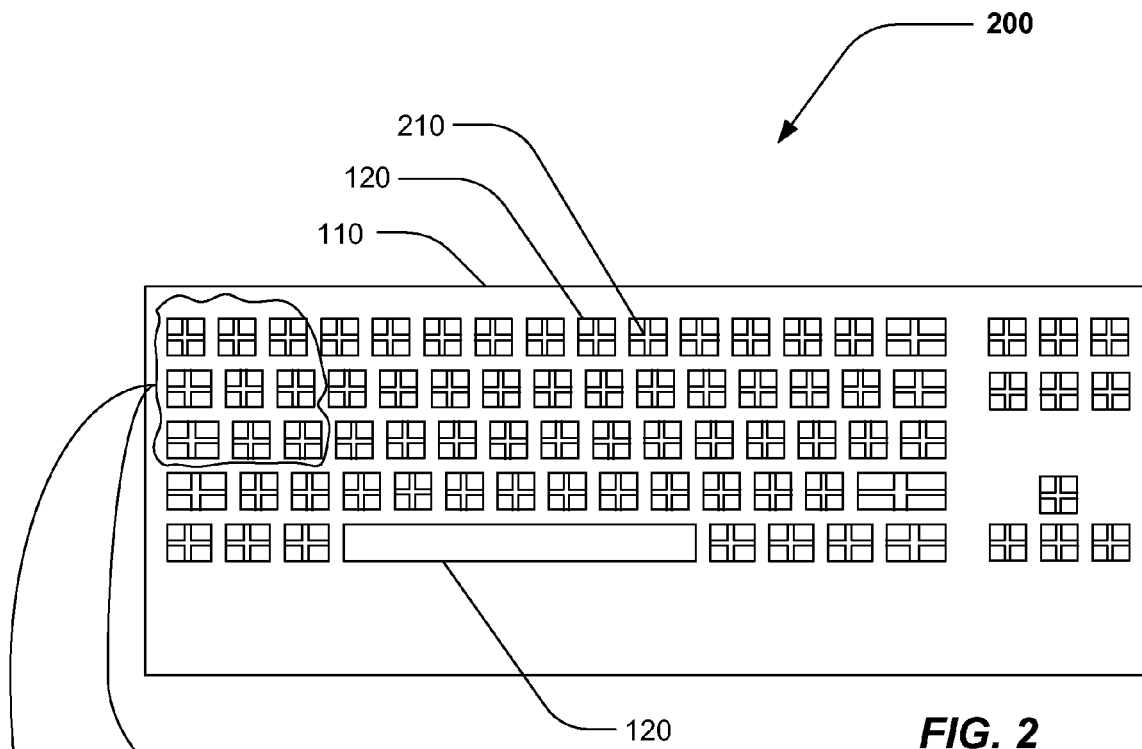
FIG. 2 is a plan view depicting an exemplary keyboard deck apparatus, according to one or more embodiments described herein.

FIG. 2 is a plan view depicting an exemplary keyboard case 200, according to one or more embodiments described. In one or more embodiments, the keyboard case 200 can be used for a "chicklet" style keyboard input device, wherein all or a portion of the keyboard case 200 will be visible to the final user after system assembly. In one or more embodiments, the keyboard case 200 can be used as a structural element in a keyboard input device for a computing system. In one or more embodiments, the keyboard case 200 can be used as both an input device and a structural element in a computer system, for example in a portable computer system such as a laptop, ultra-portable or notebook computer.

In one or more embodiments, one or more flow channels or "runners" can traverse all or a portion the mold used to form the keyboard case 200. For example, in one or more specific embodiments, one or more runners 210 can traverse one or more apertures forming the plurality of apertures 120 to improve the flow of molten material within the mold cavity. Similarly, in one or more embodiments, two or more intersecting runners 210 can be disposed in one or more of the apertures 120 forming the plurality of apertures. In one or more specific embodiments, two or more mutually bisecting runners 210 can be disposed in all or a portion of the apertures 120. In one or more specific embodiments, two or more non-intersecting runners 210 can be disposed in one or more of the apertures 120.

Figure 2A:
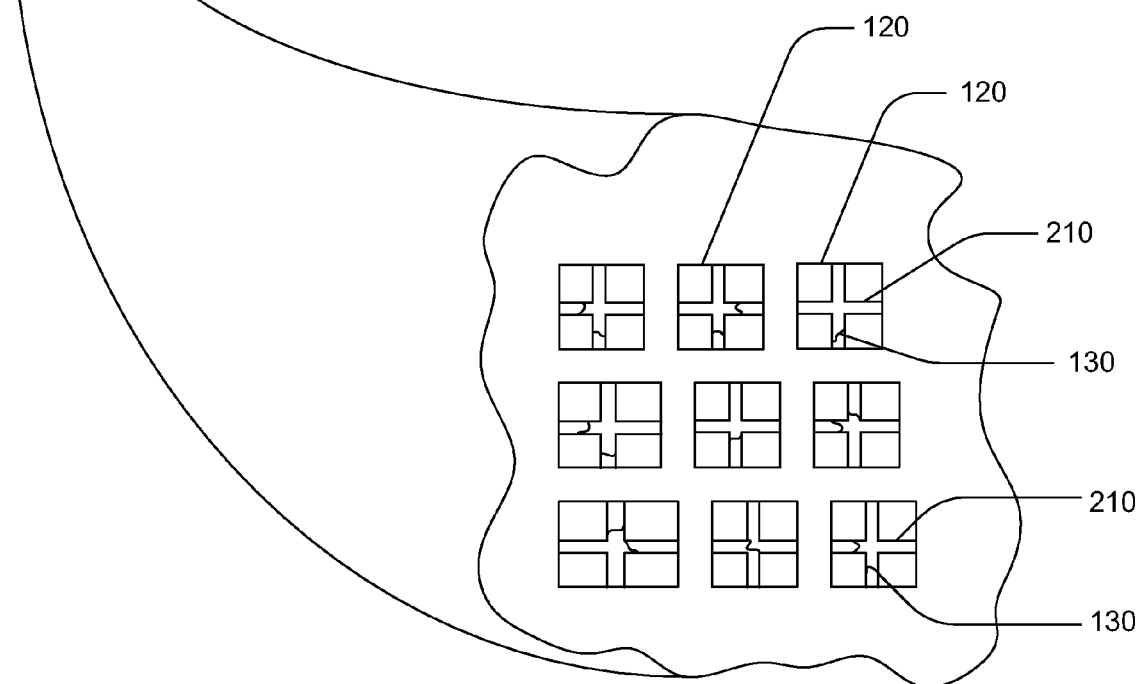
FIG. 2A is a partial detail view of the indicated portion of exemplary keyboard deck apparatus depicted in FIG. 2, according to one or more embodiments described herein.

FIG. 2A is a partial detail view of the indicated portion of exemplary keyboard case 200 depicted in FIG. 2, according to one or more embodiments. The addition of the runners 210 within all or a portion of the apertures 120 can provide additional flow paths within the mold. In one or more embodiments, the additional flow paths can decrease the mold fill time, thereby minimizing or eliminating the formation of weld lines 130 on the visible portions of the keyboard case 200. In one or more embodiments, the additional flow paths provided by the runners 210 can permit or otherwise promote the formation of weld lines on the runners 210 rather than the keyboard case 200 as depicted in FIG. 2A.

In one or more embodiments, the one or more runners 210 can be removed or otherwise detached from all or a portion of the apertures 120 after the keyboard case 200 is removed from the mold. In one or more specific embodiments, the keyboard case 200 can be introduced to a punch press or the like, where the one or more blades or dies can be passed through the one or more apertures 120 to sequentially remove all or a portion of the runners 210 from the apertures 120. In one or more specific embodiments, the keyboard case 200 can pass through a punch press where the one or more blades can be passed through all or a portion of the one or more apertures 120 to simultaneously remove all or a portion of the runners 210 from the apertures 120. The runners 210 removed from the apertures 120 can be collected for disposal or recycling. In one or more specific embodiments, all or a portion of the removed runners 210 can be recycled for use as molten material for re-injection into the keyboard case mold.

Figure 3:
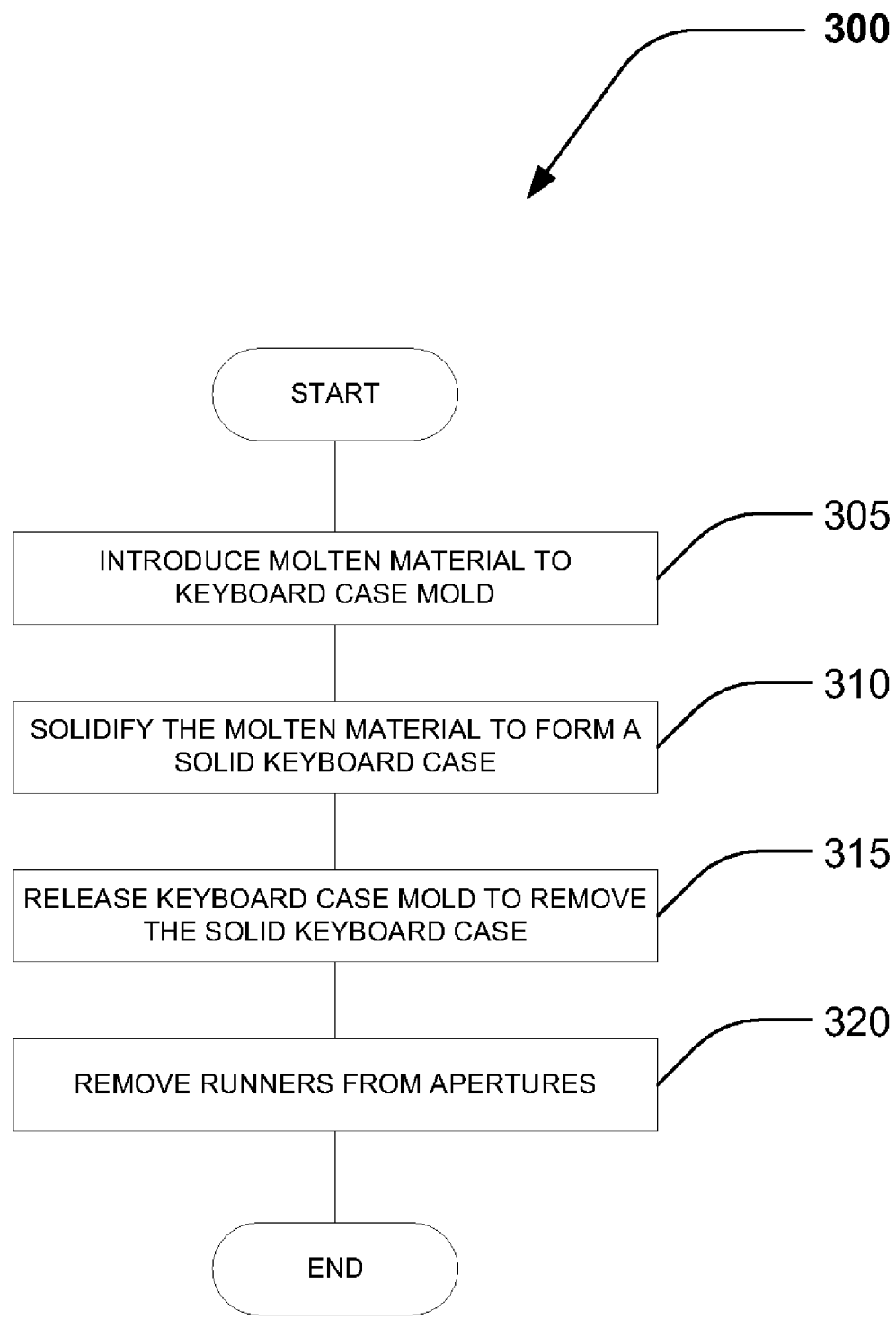
FIG. 3 depicts an illustrative logic flow diagram for manufacturing the exemplary keyboard deck apparatus depicted in FIG. 2, according to one or more embodiments described herein.

FIG. 3 depicts an illustrative logic flow diagram for manufacturing the exemplary keyboard case 200 depicted in FIG. 2, according to one or more embodiments described. In one or more embodiments, a multi-piece mold having a cavity adapted to produce the keyboard case 200 can be used to mold the keyboard case 200. The multi-piece mold can include 2 or more mold sections, 3 or more mold sections, or 4 or more mold sections. In one or more embodiments, one or more slideable mold sections can be disposed in, on, or about the mold sections forming the mold.

In one or more embodiments, in step 305, one or more molten thermosetting or thermoplastic materials can be introduced to the mold cavity within the mold to provide the keyboard case 200. Exemplary thermosetting materials can include, but are not limited to, one or more epoxy-based materials or one or more phenolic-based materials. Exemplary thermoplastic materials can include, but are not limited to, polystyrene, acrylonitrile butadiene styrene ("ABS"), polyamide, polypropylene, polyethylene, polyvinyl chloride ("PVC"), and the like. In one or more specific embodiments, one or more additives can be added to the thermosetting or thermoplastic material prior to injecting the material into the mold, such additives can include, but are not limited to, metallic particles or other colorants to improve the finished appearance of the keyboard case 200, fibers to improve the structural strength of the keyboard case 200, or any combination thereof.

In one or more embodiments, the mold can have one or more apertures or ports adapted for introducing molten thermoplastic or thermosetting material to the mold cavity. In one or more embodiments, the molten thermoplastic or thermosetting material can be introduced to the mold cavity at an elevated pressure. In one or more embodiments, the molten thermoplastic or thermosetting material can be introduced to the mold cavity at an elevated temperature. In one or more embodiments, the molten material can be introduced to the mold cavity using a heated, progressive cavity or other positive displacement pumping device. In one or more embodiments, the temperature of the thermoplastic or thermosetting material introduced to the mold cavity can be at a temperature of from about 200° F. to about 700° F.; from about 210° F. to about 600° F.; or from about 230° F. to about 530° F. In one or more embodiments, the molten material can be introduced to the mold cavity at a pressure of about 5 pounds per square in gauge ("psig") or more; about 10 psig or more; about 30 psig or more; about 60 psig or more; about 150 psig or more; or about 300 psig or more.

In one or more embodiments, in step 310, the molten thermosetting or thermoplastic material introduced to the mold in step 305 can be cooled and at least partially solidified within the mold. In one or more embodiments, pressure can be maintained on the material contained the mold until the thermosetting or thermoplastic material at least partially solidifies. In one or more embodiments, the mold can be partially or completely cooled without the addition of one or more heat removal devices or fluids in step 310, i.e. convectively cool without the use of one or more enhanced heat transfer devices.

In one or more embodiments, once the keyboard case 200 has at least partially solidified, the keyboard case 200 can be removed or otherwise released from the mold in step 315. In one or more embodiments, the keyboard case 200 can be removed or otherwise released by opening or otherwise altering the position of one or more sections of the mold with respect to the other sections forming the mold. In one or more embodiments, one or more retractable ejector pins disposed within the walls forming the mold cavity can be used to enhance the release of the keyboard case 200 from the mold. In one or more embodiments, the mold opening can occur in a slow-fast-slow pattern. The mold can initially be opened slowly to at least partially release any vacuum formed by the injection molding process and prevent the part from staying on the stationary mold half. In one or more embodiments, after opening the mold to at least partially break the vacuum, the mold sections can be rapidly separated to remove the keyboard case 200 contained within the mold cavity within the mold.

After removing the keyboard case 200 from the mold, the one or more runners 210 disposed within the one or more apertures 120 can be removed in step 320. In one or more embodiments, the one or more runners 210 can be removed within the mold itself, for example using one or more slideable mold elements. In one or more embodiments, the one or more runners 210 can be removed using a device remote from the mold, for example using one or more shears or punches. In one or more embodiments, the one or more runners 210 can be shorn, punched, or otherwise removed from within all or a portion of the one or more apertures 120 using a punch press or similar device.

Figure 4:
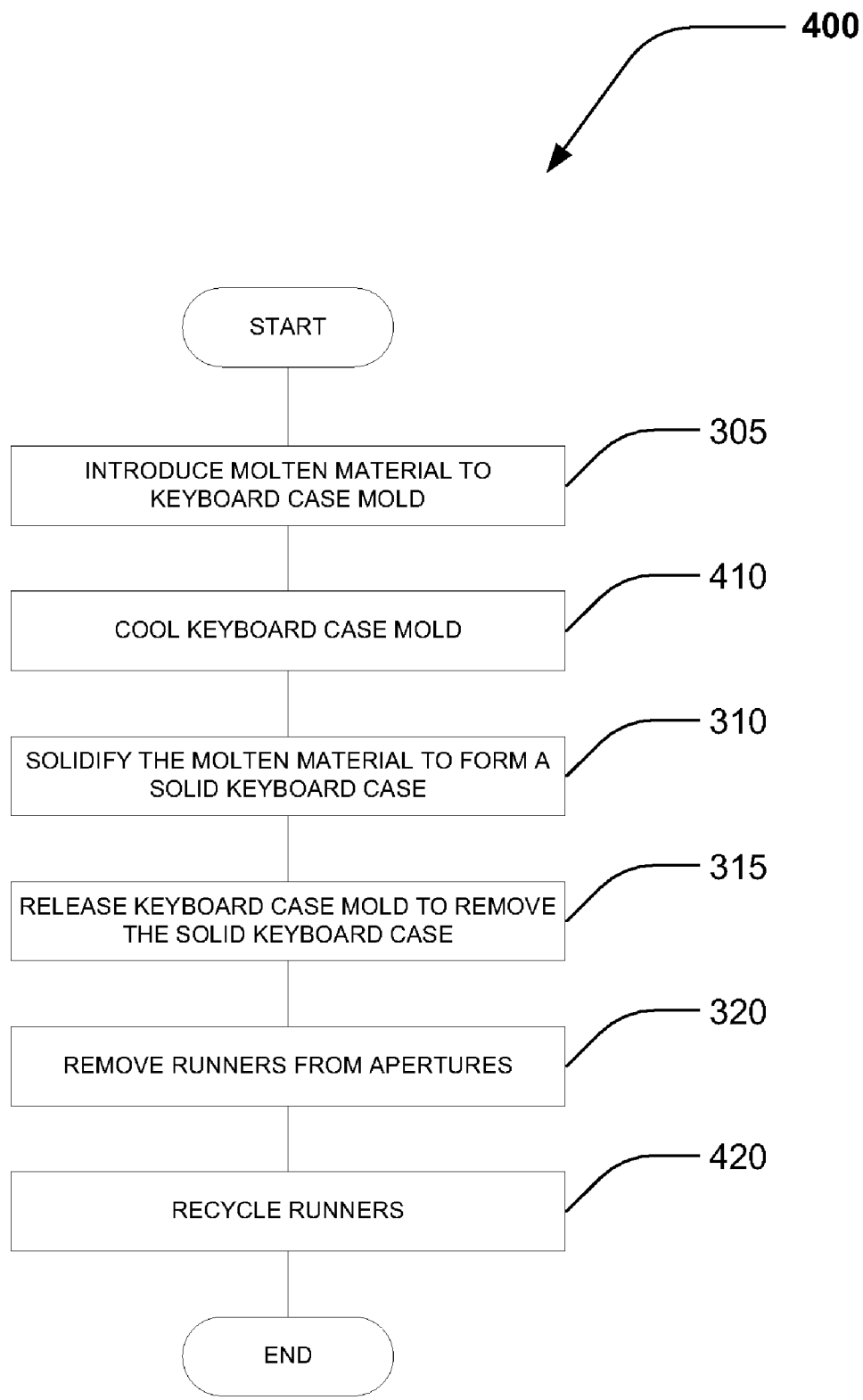
FIG. 4 depicts another illustrative logic flow diagram for manufacturing the exemplary keyboard deck apparatus depicted in FIG. 2, according to one or more embodiments described herein.

FIG. 4 depicts another illustrative logic flow diagram 400 for manufacturing the exemplary keyboard deck apparatus depicted in FIG. 2, according to one or more embodiments described. In one or more embodiments, after introducing the molten material to the mold in step 305, one or more coolants can be circulated through the mold in step 410. In one or more embodiments, the mold can be partially or completely cooled with the addition of one or more heat removal devices or fluids in step 310, for example by passing one or more heat transfer fluids such as cooled water, or a cooled glycol/water mixture through one or more cooling channels or conduits disposed in, on, or about the mold. Circulation of coolant through the mold can hasten the cooling and solidification of the molten material within the mold to provide the keyboard case 200. In one or more specific embodiments, circulating a coolant through the mold can preferentially reduce the cooling time of the molten material, thereby reducing the overall mold cycle time and increasing overall process efficiency.

In one or more embodiments, the keyboard case 200 can be further cooled within the mold. The in-mold cooling of the keyboard case in step 310 can be accomplished with or without the use of supplemental coolants such as liquid or gaseous coolants circulated or otherwise passed through one or more chambers disposed in, on, or about the mold. In one or more embodiments, the keyboard case 200 can be released or otherwise removed from the mold in step 315.

In one or more embodiments, the one or more runners 210 disposed in all or a portion of the apertures 120 can be partially or completely removed in step 320. In one or more embodiments, the one or more runner 210 can be sequentially or simultaneously removed from the one or more apertures 120. In one or more embodiments, all or a portion of the runners 210 removed from the one or more apertures 120 can be collected for recycle or reuse.

After removing the runners 210 from all or a portion of the one or more apertures in step 320, the runners can be collected and recycled in step 420. In one or more embodiments, all or a portion of the runners 210 can be recycled to provide all or a portion of the molten material introduced to the mold in step 305. In one or more embodiments, the collected runners from step 420 can be ground into power or granules prior to recycling. In one or more embodiments, all or a portion of the collected runners from step 420 can be transported off-site for reprocessing or recycling.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for manufacturing a keyboard case comprising:
    filling a mold cavity with a molten material;
    wherein the mold cavity is configured to provide a keyboard case having a plurality of apertures; and
    wherein at least two runners traverse at least a portion of the plurality of apertures;

at least partially solidifying the molten material to form the keyboard case;

retrieving the keyboard case from said mold cavity; and removing the at least two runners from at least a portion of the plurality of apertures.

2. The method of claim 1, wherein the mold comprises a mold having two or more sections.

3. The method of claim 1, further comprising cooling the mold prior to releasing the mold.

4. The method of claim 3, wherein cooling the mold comprises disposing at least one cooling conduit in the mold; and passing a coolant through the at least one cooling conduit.

5. The method of claim 1, wherein removing the at least two runners from at least a portion of the plurality of apertures comprises passing a punch press through at least a portion of the plurality of apertures.

6. The method of claim 1, wherein the at least two runners comprises two mutually bisecting runners.

7. The method of claim 1, wherein the plurality of apertures correspond to the keys on a standard 101-key computer keyboard.

8. The method of claim 1, wherein the molten material comprises a thermoplastic material selected from the group consisting of: polystyrene, acrylonitrile butadiene styrene ("ABS"), polyamide, polypropylene, polyethylene, and polyvinyl chloride ("PVC").

9. The method of claim 1, wherein the molten material comprises a thermosetting material selected from the group consisting of: an epoxy-based material and a phenolic-based material.

10. A method for forming a keyboard upper case comprising:

injection molding the keyboard upper case;

wherein a plurality of apertures are disposed about the keyboard upper case; and wherein at least two runners are disposed in at least a portion of the plurality apertures; and removing the at least two runners therefrom.

11. The method of claim 10, wherein the at least two runners comprise two mutually bisecting runners.

12. The method of claim 10, wherein the plurality of apertures correspond to the keys on a standard 101-key computer keyboard.

13. The method of claim 10, wherein removing the at least two runners from at least a portion of the plurality of apertures comprises passing a punch press through at least a portion of the plurality of apertures.

14. A system for manufacturing a keyboard case comprising:

a means for filling a mold cavity with a molten material;

wherein the mold cavity is configured to provide a keyboard case having a plurality of apertures; and wherein at least two runners traverse at least a portion of the plurality of apertures;

a means for at least partially solidifying the molten material to form the keyboard case;

a means for retrieving the keyboard case from said mold cavity; and a means for removing the at least two runners from at least a portion of the plurality of apertures.

15. The system of claim 14, wherein the means for removing the at least two runners from at least a portion of the plurality of apertures comprises a punch press.

16. The system of claim 14, further comprising a means for cooling the mold prior to releasing the mold.

17. The system of claim 16, wherein cooling the mold comprises a means for disposing at least one cooling conduit in the mold; and a means for passing a coolant through the at least one cooling conduit.

18. The system of claim 14, wherein the at least two runners comprises two mutually bisecting runners.

19. The system of claim 14, wherein the molten material comprises a thermoplastic material selected from the group consisting of: polystyrene, acrylonitrile butadiene styrene ("ABS"), polyamide, polypropylene, polyethylene, and polyvinyl chloride ("PVC").

20. The system of claim 14, wherein the molten material comprises a thermosetting material selected from the group consisting of: an epoxy-based material and a phenolic-based material.

\* \* \* \* \*

UNITED STATES PATENT AND TRADEMARK OFFICE
CERTIFICATE OF CORRECTION

| | | |
|---|---|---|
| PATENT NO. | : 7,935,287 B2 | Page 1 of 1 |
| APPLICATION NO. | : 12/399677 | |
| DATED | : May 3, 2011 | |
| INVENTOR(S) | : Mark S Tracy et al. | |

It is certified that error appears in the above-identified patent and that said Letters Patent is hereby corrected as shown below:

In column 7, line 20, in Claim 6, delete "comprises" and insert -- comprise --, therefor.

In column 7, line 39, in Claim 10, delete "plurality apertures" and insert -- plurality of apertures --, therefor.

Signed and Sealed this
Eighteenth Day of October, 2011

David J. Kappos
*Director of the United States Patent and Trademark Office*